US011220467B2

(12) United States Patent
Weeks et al.

(10) Patent No.: US 11,220,467 B2
(45) Date of Patent: Jan. 11, 2022

(54) INDOOR FOOD WASTE FERMENTATION AND RECYCLING PROCESS

(71) Applicant: Recycle Track Systems Inc., New York, NY (US)

(72) Inventors: Amanda Weeks, Brooklyn, NY (US); Brett Van Aalsburg, Brooklyn, NY (US); Erik Vosburgh, Brooklyn, NY (US); Maria del Pilar Sanchez Rodriguez, New York, NY (US)

(73) Assignee: Recycle Track Systems, Inc., New York, NY (US)

( * ) Notice: Subject to any disclaimer, the term of this patent is extended or adjusted under 35 U.S.C. 154(b) by 801 days.

(21) Appl. No.: 15/867,948

(22) Filed: Jan. 11, 2018

(65) Prior Publication Data
US 2018/0194698 A1 Jul. 12, 2018

Related U.S. Application Data

(60) Provisional application No. 62/444,929, filed on Jan. 11, 2017, provisional application No. 62/517,094, filed on Jun. 8, 2017.

(51) Int. Cl.
| | |
|---|---|
| *C05F 17/50* | (2020.01) |
| *H01M 8/16* | (2006.01) |
| *C11D 3/20* | (2006.01) |
| *C05F 9/02* | (2006.01) |
| *C05F 17/20* | (2020.01) |
| *C05F 17/60* | (2020.01) |
| *C05F 17/964* | (2020.01) |

(52) U.S. Cl.
CPC ............. *C05F 17/50* (2020.01); *C05F 9/02* (2013.01); *C05F 17/20* (2020.01); *C05F 17/60* (2020.01); *C05F 17/964* (2020.01); *C11D 3/201* (2013.01); *C11D 3/2079* (2013.01); *C11D 3/2086* (2013.01); *H01M 8/16* (2013.01); *Y02A 40/20* (2018.01); *Y02E 60/50* (2013.01); *Y02P 20/145* (2015.11); *Y02W 30/40* (2015.05)

(58) Field of Classification Search
CPC ..... Y02A 40/215; Y02E 60/50; Y02E 60/527; Y02P 20/145; Y02W 30/40; Y02W 30/43; Y02W 30/47
See application file for complete search history.

(56) References Cited

U.S. PATENT DOCUMENTS

| | | | | |
|---|---|---|---|---|
| 4,053,394 A * | 10/1977 | Fisk | ........................... | C05F 7/00 |
| | | | | 210/605 |
| 6,121,032 A * | 9/2000 | Cooney, Jr. | ............. | C05F 17/20 |
| | | | | 435/198 |
| 6,136,590 A | 10/2000 | Kruse | | |
| 7,695,834 B1 * | 4/2010 | Borole | ................ | H01M 4/8605 |
| | | | | 427/115 |
| 7,867,736 B2 | 1/2011 | Van Krieken | | |
| 8,734,968 B2 * | 5/2014 | Chae | ................... | H01M 4/8867 |
| | | | | 429/2 |
| 8,846,399 B2 | 9/2014 | Martin et al. | | |
| 9,416,062 B2 | 8/2016 | Morash et al. | | |
| 10,174,347 B2 | 1/2019 | Stephanopoulos et al. | | |
| 2008/0277273 A1 * | 11/2008 | Logan | ..................... | H01M 8/16 |
| | | | | 204/253 |
| 2008/0311244 A1 * | 12/2008 | Jeon | ........................ | A23L 11/37 |
| | | | | 426/46 |
| 2009/0162923 A1 * | 6/2009 | Young | ...................... | C05F 9/00 |
| | | | | 435/267 |
| 2010/0112380 A1 * | 5/2010 | Li | ........................... | H01M 8/16 |
| | | | | 429/2 |
| 2010/0119920 A1 * | 5/2010 | Logan | ................. | H01M 4/9008 |
| | | | | 429/401 |
| 2010/0319424 A1 | 12/2010 | Wietgrefe | | |
| 2011/0287498 A1 | 11/2011 | Medoff et al. | | |
| 2014/0273138 A1 * | 9/2014 | Langhauser | .......... | A23K 10/38 |
| | | | | 435/165 |
| 2014/0364362 A1 | 12/2014 | Jowett et al. | | |
| 2015/0361457 A1 | 12/2015 | Medoff et al. | | |

(Continued)

FOREIGN PATENT DOCUMENTS

| | | |
|---|---|---|
| CA | 2598539 C | 8/2006 |
| WO | WO2016085545 A1 | 6/2016 |

OTHER PUBLICATIONS

Elferik et al., Anerobic Conversion of Lactic Acid to Acetic Acid and 1,2 Propanediol by Lactobacillus buchineri, Applied and Environmental Microbiology, Jan. 2001, p. 125-132, vol. 67, No. 1, American Society for Microbiology.

Bolzonella et al., Anaerobic Fermentation of Organic Municipal Solid Wastes for the Production of Soluble Organic Compounds, Ind. Eng. Chem. Res., 2005, p. 3412-3418, vol. 44.

Calt, Products Produced From Organic Waste Using Managed Ecosystem Fermentation, Journal of Sustainable Development, May 14, 2015, p. 43-51, vol. 18, No. 3, Canadian Center of Science and Education.

Habova et al., Electrodialysis as a useful technique for lactic acid separation from a model solution and a fermentation broth, Desalination, Mar. 10, 2004, p. 361-372, vol. 162.

(Continued)

*Primary Examiner* — Blaine Lankford
(74) *Attorney, Agent, or Firm* — Zeller IP Group, PLLC; Kyle M. Zeller

(57) ABSTRACT

A process for fermenting and recycling food waste that is fully enclosed, eliminating noxious odors, and therefore installable in a wide variety of urban settings at scale. Generally the steps of the process include intake, shredding and grinding, inoculation and acceleration, heterolactic fermentation, separation of solids and liquids, drying and distillation, and post-processing of liquid and solid byproducts. The result of the process includes useful goods such as nutrient-rich soil fertilizer, household cleaning agent, energy in the form of current or hydrogen, and treated water. The process is energy efficient and self-contained, resulting in the processing of food waste within 7 days, thus dramatically reducing the time of traditional fermentation processes to produce desired byproducts.

25 Claims, 3 Drawing Sheets

(56) References Cited

U.S. PATENT DOCUMENTS

| | | |
|---|---|---|
| 2016/0355849 A1 | 12/2016 | Stephanopoulos et al. |
| 2018/0193801 A1 | 7/2018 | Medoff et al. |

OTHER PUBLICATIONS

Ghaffar et al., Recent trends in lactic acid biotechnology: A brief review on production to purification, Journal of Radiation Research and Applied Sciences, 2014, p. 1-8.

Joglekar et al., Comparative assessment of downstream processing options for lactic acid, Separation of Purification Technology, 2006, p. 1-17, vol. 52.

Komesu et al., Lactic Acid Purification by Hybrid Short Path Evaporation, Chemical Engineering Transactions, 2013, p. 2017-2022, vol. 32, The Italian Association of Chemical Engineering.

Komesu et al., Lactic Acid Production to Purification: A Review, BioResources, 2017, p. 4364-4383, vol. 12(2).

Kumar et al., A continuous process for the recovery of lactic acid by reactive distillation, J Chem Technol Biotechnol, 2006, p. 1767-1777, vol. 81.

Litchfield, Microbiological Production of Lactic Acid, Advances in Applied Microbiology, 1996, p. 45-95, vol. 42, Academic Press, Inc.

Lopez-Garzon et al., Recovery of carboxylic acids produced by fermentation, Biotechnology Advances, 2004, p. 1-31.

Martinez et al., Lactic acid properties, applications and production: A review, Trends in Food Science & Technology, 2013, p. 70-83, vol. 30.

Habova et al., Modern Method of Lactic Acid Recovery from Fermentation Broth, Czech J. Food Sci., 2004, p. 87-94, vol. 22, No. 3.

Miller et al., Industrial Production of Lactic Acid, Bio-Based Chemicals, 2011, p. 179-188.

Pal et al., Process intensification in lactic acid production: A review of membrane based processes, Chemical Engineering and Processing: Process Intensification, 1009, p. 1549-1559, vol. 48.

Evangelista, Recovery and purification of lactic acid from fermentation broth by adsorption, Retrospective Theses and Dissertations, 1994, Iowa State University.

Redcorn, Identifying Conditions to Optimize Lactic Acid Production From Food Waste, Open Access Theses, 2014, Purdue University.

Sakai et al., Total Recycle System of Food Waste for Poly-L-Lactic Acid Output, Advances in Applied Biotechnology, Jan. 20, 2012, p. 23-40.

Velis et al., Biodrying for mechanical-biological treatment of wastes: A review of process science and engineering, Bioresource Technology, 2009, p. 2747-2761, vol. 100.

Vink et al., The eco-profile for current Ingeo polylactide production, Industrial Biogechnology, Aug. 2010, p. 212-224.

Yang et al., Lactic acid fermentation of food waste for swine feed, Bioresource Technology, 2006, p. 1858-1864, vol. 97.

International Search Report and Written Opinion issued for PCT/US2020/038423, dated Sep. 18, 2020, 9 pp.

\* cited by examiner

INDOOR FOOD WASTE FERMENTATION AND RECYCLING PROCESS

CROSS REFERENCE TO RELATED APPLICATIONS

This application is a continuation of U.S. Provisional Appl. No. 62/444,929 filed on Jan. 11, 2017; and U.S. Provisional Appl. No. 62/517,094 filed on Jun. 8, 2017.

FIELD OF THE INVENTION

The invention lies in the fields of waste treatment and recovery, food waste processing, and also in the field of acidic fermentation of organic waste.

BACKGROUND

Anaerobic fermentation of carbohydrates is a well-known process for turning plant-based materials into organic acids and alcohol. Anaerobic fermentation is used in a wide variety of applications including beer and wine production, and the pickling and preservation of foods. Anaerobic fermentation relies on yeasts, bacteria, and other microorganisms, which process the organic matter into organic acids and alcohols. For instance, under suitable conditions, inoculation of *saccharomyces* will produce ethyl alcohol, while *lactobacillus* will produce lactic acid. Lactic acid fermentation is an ancient method for food preservation during which spoilage and pathogenic organisms such as yeasts, molds, enterobacteria, bacilli, and clostridia are inhibited by the conditions developed throughout fermentation, i.e. decrease in pH, low oxidation reduction potential, and competition for essential nutrients. Related fermentation processes have also been described for home use to process plant and animal-based waste into a soil fertilizer. For many reasons, not least because they require a lengthy fermentation period that would be inefficient for large volumes of waste, these processes have typically not been applied on a large scale.

Food waste is typically the largest component of urban solid waste streams, and often ultimately is deposited in landfill. As landfill, the carbohydrate-rich nutrients from food waste can enter the groundwater and contribute to acidification, algal blooms, and cause many other risks to human health. It would thus be desirable to have a means for recycling food waste, to reduce our landfill burden and reduce harmful effects on groundwater.

While others have proposed recycling of food waste at larger scale, many focus on the production of methane because of its value as an energy source, and do not address the extended fermentation or digestion periods required. Methane production moreover emits noxious odors and greenhouse gases, and must therefore be built at some distance away from urban centers. It would be preferable to take a more sustainable approach and build solid waste treatment sites closer to sources of waste. For this to be palatable to municipalities, however, this approach would require drastic reductions in emissions of gases and odors. It would also be preferable for these urban treatment sites to be self-contained and easily replicable and scalable, for mass adoption.

SUMMARY

It is an object of the invention to provide a scalable food waste recycling process capable of accepting large volumes of waste on any given day. It is another object of the invention to provide a process for treating and recycling food waste within 7 days. It is another object of the invention to treat and recycle the food waste in a manner that minimizes harmful byproducts and instead maximizes useful end products, namely by resulting in the production of energy, probiotic soil fertilizer, chemical and enzyme solutions, and treated water. It is a further object of the invention to minimize the energy requirement of carrying out this process.

It is another object of the present invention to provide a process that can be carried out in a relatively compact, contained facility that can easily be installed at the urban level, for instance by not releasing noxious odors or attracting pests, and is easily replicable and scaled. It is a further object of the present invention to provide a system for carrying out this process in an enclosed environment. It is a further object to minimize greenhouse gases from being emitted. By way of example, it should be noted that it is not an object of the present invention to produce methane, which would necessitate safe means for storage and transport, and would typically not be feasible to install in an urban environment.

In pursuit of these objects, the invention is a process for recycling food and other organic waste, comprising the steps of: (1) screening and intake of food waste; (2) reducing the food waste into uniformly sized particles; (3) accelerating fermentation of the food waste by applying an inoculant to the food waste contained in a rotating tank, raising the internal temperature of the rotating tank to between twenty and fifty degrees Celsius, and rotating the tank for up to 48 hours; (4) fermenting, in a fermentation tank, the accelerated food waste until it reaches pH of 5 or below; (5) separating solid fermented food waste from fermentation-treated liquid; (6) drying the solid fermented food waste, and simultaneously collecting a fermentation distillate during the drying process, until the solid fermented food waste achieves 50% or greater reduction in weight comprising a dried fermented food waste; and (7) post-processing the dried fermented food waste into one or more treated byproducts.

BRIEF DESCRIPTION OF THE DRAWINGS

The invention may take form in various components and arrangements of components, and in various steps and arrangement of steps. The drawings are only for purposes of illustrating preferred embodiments and are not to be construed as limiting the invention.

DETAILED DESCRIPTION OF THE INVENTION

Figure 1:
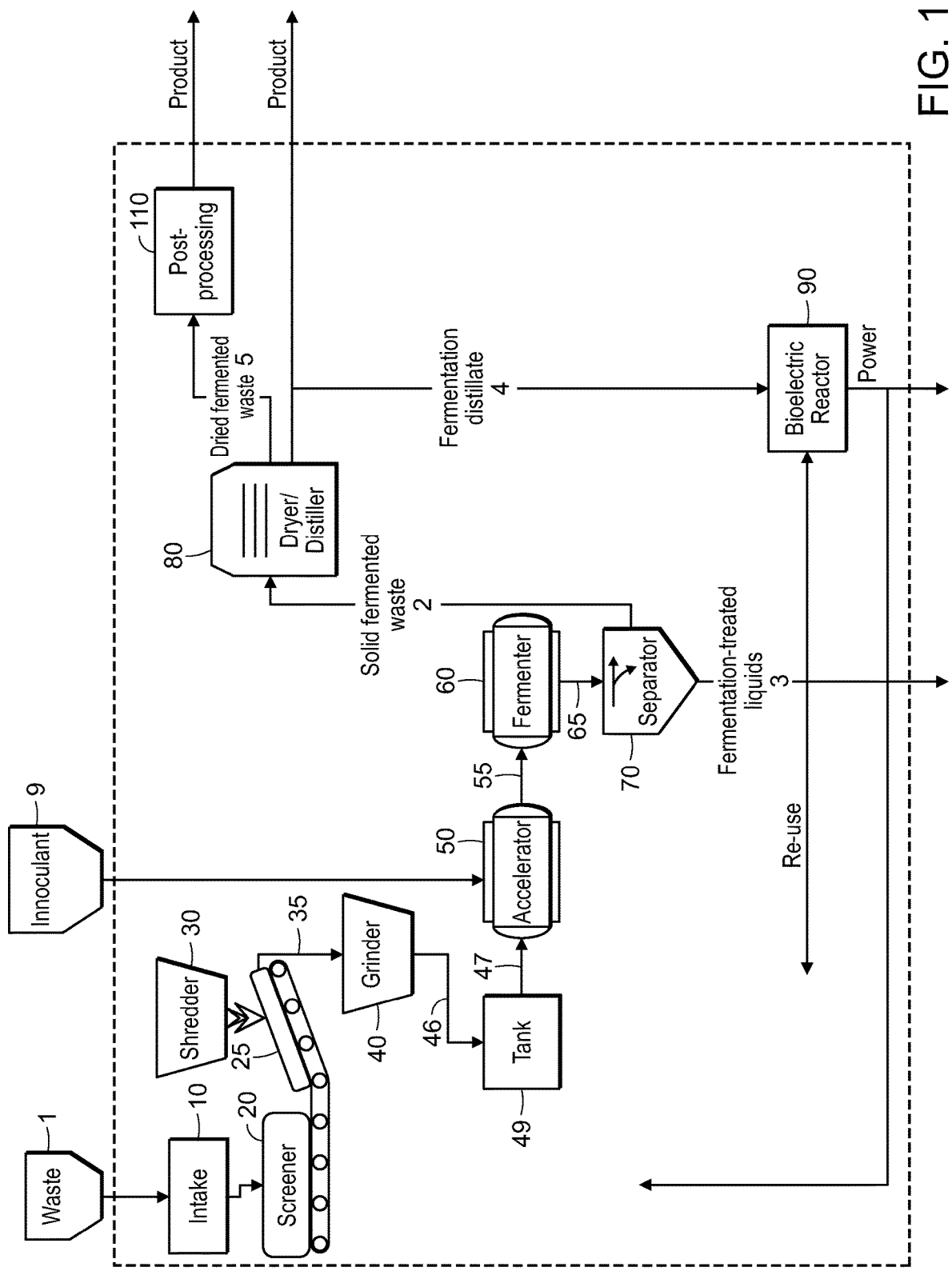
FIG. 1 is a schematic diagram illustrating an exemplary food waste recycling system and method.
Figure 2:
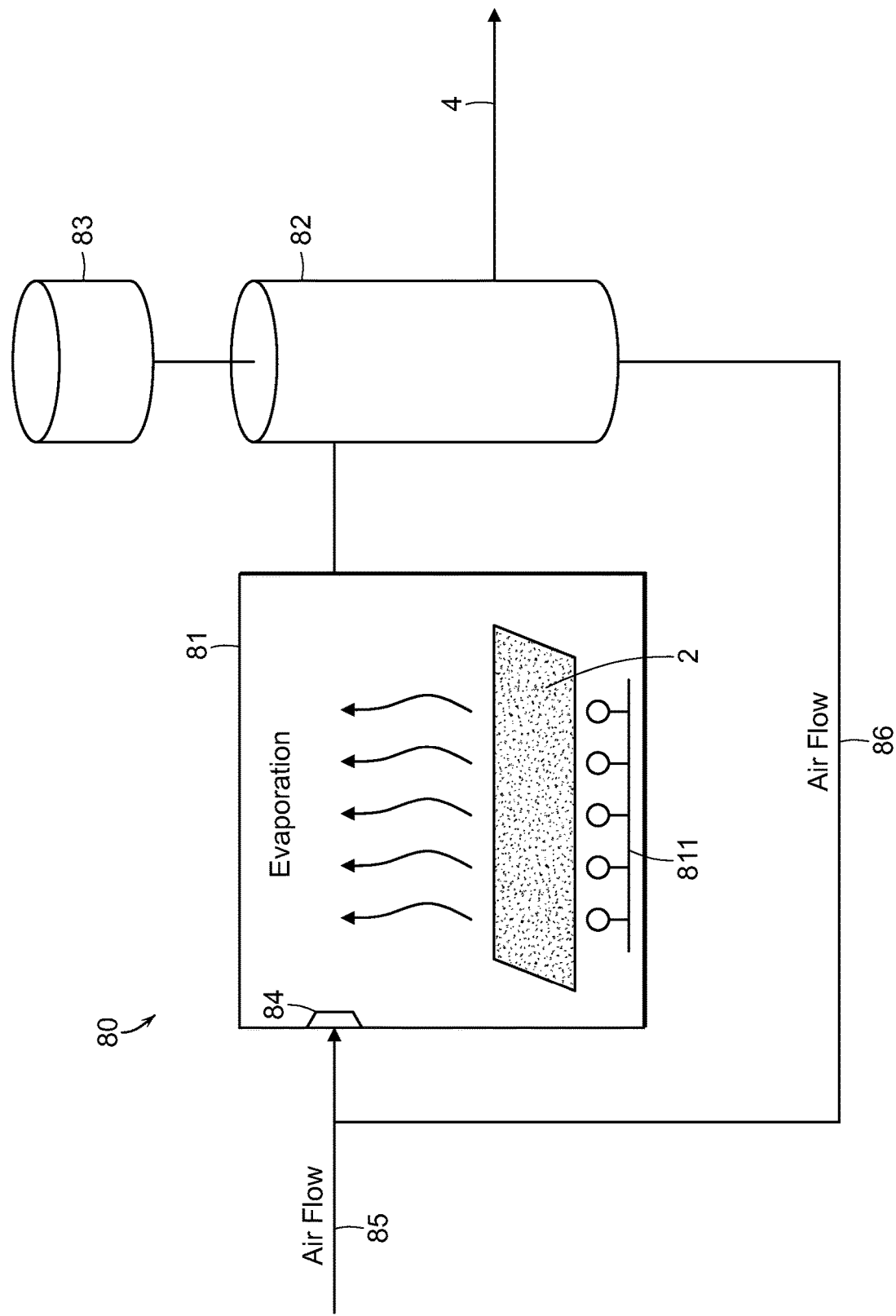
FIG. 2 is a schematic diagram illustrating an exemplary drying apparatus of the present invention.
Figure 3:
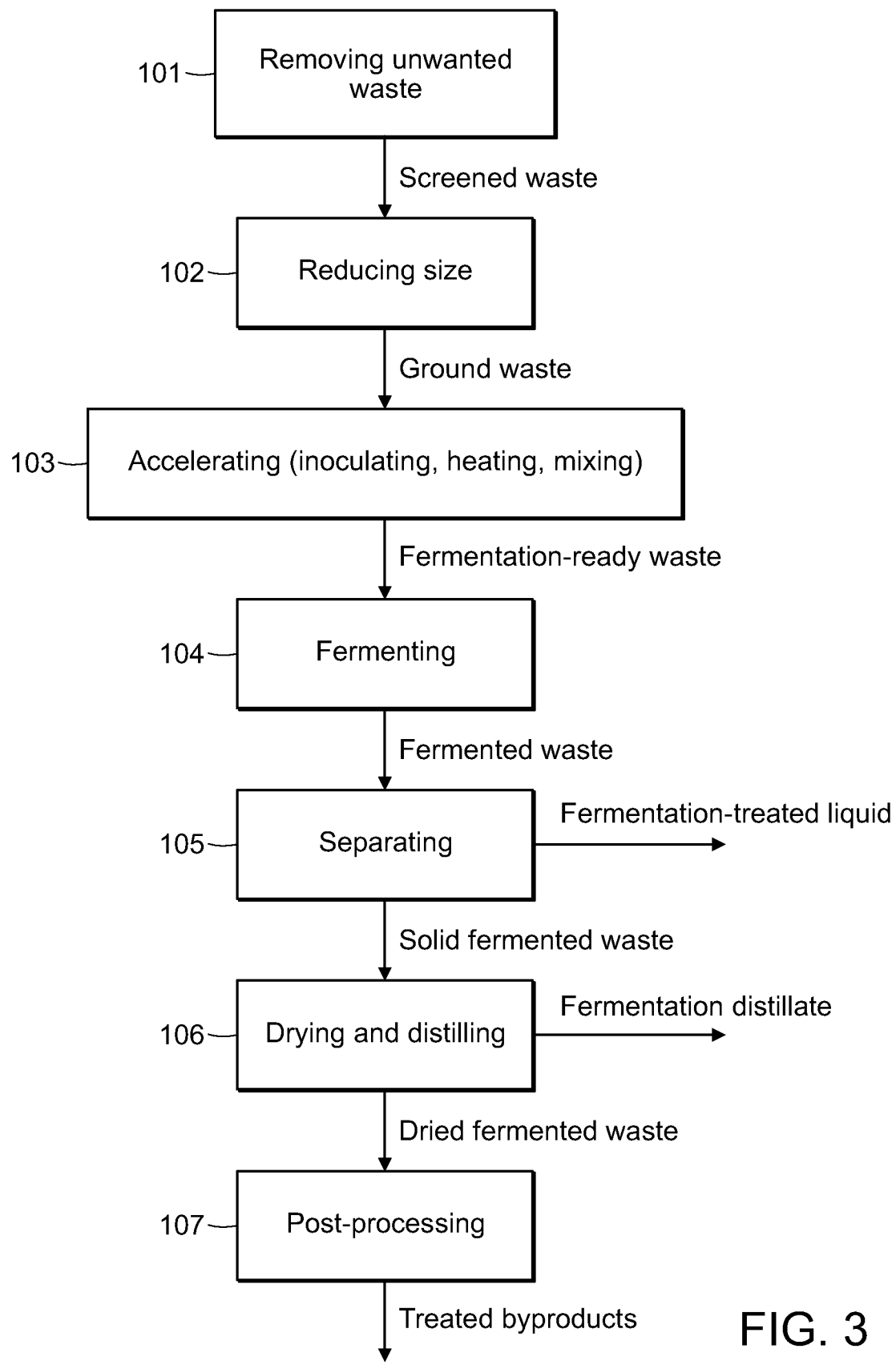
FIG. 3 is a flow chart showing the steps of an embodiment of the present invention.

The various embodiments of the present invention will now be described with reference to FIGS. 1-3. The invention is a process for recycling food and other organic waste, particularly from and within an urban environment. The type of waste that can be processed using this invention will hereinafter be referred to as "food waste" or "waste" but can include any type of organic waste, whether derived from food or not, including, but not limited to, garden waste and debris, animal feed, etc. . . . without departing from the spirit of the invention. However, the preferred embodiment generally contemplates the processing of urban food waste that would be generated, for example, by restaurants, businesses, schools, households and food processing facilities.

Intake and Screening

The preferred embodiment is a process that can be carried out in a facility that is fully enclosed in a relatively compact space, and therefore installable in a wide variety of urban settings while remaining compliant with municipal laws and regulations governing the distance of the site from homes or buildings, or regarding the output of odors and noxious emissions. The waste treatment facility accepts food waste 1 from haulers, which can be invited to deposit collected food waste at an intake location 10 at the facility. Preferably, the food waste is transported in containers specifically designed for the transportation of food waste. Upon delivery to the facility, the food waste containers can be weighed and inspected. One or more parameters associated with the food waste, for instance, weight, moisture content, and/or pH, can be logged.

In order to facilitate installment of the described system at an urban level, the process may comprise an intake step for facilitating and analyzing the collection of food waste from city dwellers, restaurants, schools, businesses and industrial food waste sources. Each customer that sends waste to the facility will use food waste collection containers marked with a tracking number associated with the customer. After the bins are deposited at the facility by waste haulers, in some embodiments their contents are scanned and analyzed at intake unit 10. The intake unit uses computer-aided tracking to associate the composition of a bin with the tracking number and thus the customer. For instance, in some embodiments the intake unit may be equipped with a monitoring camera which provides a visual record of all materials received. This enables customer billing based on actual weight collected, and potentially alternative parameters, while also providing useful data regarding the food waste composition.

The accepted food waste is deposited to a screening enclosure 20 that is enclosed to contain odors. Unwelcome components such as cutlery, cups, napkins, or other non-food and non-organic wastes are removed 101. In the preferred embodiment, the screening box assembly comprises a food grade conveyer contained within a containerized glove box enclosure, which enables screening to be performed by hand through gloves that can reach into the interior of the enclosure and access the contents on the conveyer. In other embodiments, screening is automated and can be performed by computerized methods, including but not limited to: sensors, air currents, weight-based, air knife apparatus, or advanced optical screeners. In the contemplated embodiment, only inorganic items are removed, but removal does not need to be limited to non-organic waste and in some cases may be used to remove organic elements. For instance, some organic elements may be deemed too large for the process or unsuitable for acidic fermentation. The purpose of enclosed removal is to reduce odors and promote a clean and sterile facility environment.

The removal step 101 results in a screened waste that can be conveyed 25 forward to size reduction step 102.

Size Reduction

The screened waste should be reduced 102 to uniformly sized particles, in order to optimize conditions for fermentation. In the preferred embodiment, screened waste is first shredded by industrial shredding blades 30 as it is transmitted by conveyer 31, which reduce the screened waste size preferably to no larger than one cubic inch. The shredded screened waste drops from the conveyer into grinder 40. Grinder 40 is operable to further reduce the waste to a small, uniform particle size, preferably a maximum of ½ cubic inch. As an example, the grinder may be an industrial waste disposal grinder. Preferably the grinder is fed by a covered hopper that receives the conveyed material, controlling the flow rate and any potential particle emissions. The combination of shredding and grinding steps enables the adaptation of currently existing machinery to efficiently result in the desired particle size.

Alternative means for reducing the size of the screened waste may be implemented without departing from the spirit of the invention. For instance, some embodiments may use an industrial shredder comprising shearing blades for generally reducing the size of the waste, and the waste may be batched and transmitted to a grinder without using a conveyer apparatus. Where batching is implemented, it may be necessary to utilize holding tanks in order to accumulate sufficient volumes and maximize throughput. Nor does the reduction 102 of screened waste into uniformly sized particles need be performed in two steps, and instead may be accomplished in a single step using custom made cutting machinery.

Depending on the means used, the reduction step may require additional lubrication. In particular, a small amount of water may be introduced to aid in grinding and also enables the ground waste to be pumped instead of conveyed. In some embodiments of this process, lubrication can be facilitated by the addition of liquids that accumulate in other steps in the process. For instance, fermentation-treated liquid 3 from solid-liquid separator 70 may be used to lubricate the reduction step. In the aforesaid example, the re-use of fermentation-treated liquid 3 may also have the beneficial effect of stabilizing pH of the food waste, further optimizing acidic fermentation.

In some embodiments, the resulting reduced waste may be sterilized to destroy biological and chemical contaminants. Methods of sterilization include, but are not limited to, UV, steam pasteurization, and freezing.

After size reduction step 102, the ground waste can be pumped 45 or otherwise transferred to accelerator 50 for acceleration step 103. In some embodiments, grinder 40 can be connected to a holding tank in which accumulated ground waste is batched before pumping to accelerator 50.

Acceleration

Accelerator 50 receives the ground waste and an inoculant of organisms that carry out anaerobic, acidic fermentation, and accelerates 103 said fermentation by mixing the ground waste and the inoculant at a temperature from twenty to fifty degrees Celsius. Rotation can be performed by a continuously stirred tank reactor (CSTR), or similar industrial agitator. The inoculant is a mixture of organisms selected from, by way of example, *Lactobacillus plantarum, Lactobacillus casei, Lactobacillus fermentum, Lactobacillus delbrueckii, Bacillus subtilis, Saccharomyces cerevisiae,* and/or *Rhodopseudomonas palustris*. The mixture of organisms in the inoculant can vary and comprise other organisms not listed here, without departing from the spirit of the invention, so long as the organisms play a part in acidic fermentation.

Accelerator 50 is operable to raise and maintain the temperature of the ground waste in the range of twenty to fifty degrees Celsius. For instance, in one embodiment the ground waste is heated to 37 degrees Celsius. The preferred means for heating the ground waste is to heat the contents of the accelerator by the circulation of a heated fluid, liquid or gas, convectively on the tank's surface using a heating element. For instance, the accelerator may comprise an industrial incubator such as a rotary mixing tank within a large enclosure that comprises an electrical heat source below the rotary mixing tank and an air input source for the convection of hot air over the surface of the tank as it rotates. As another example, the accelerator may comprise a jacketed mixer with internal mechanical mixing means and an inlet for heated gas to enter the mixer. In embodiments using heated gas mixing with the food waste, said heated gas can be re-circulated CO2 produced by anaerobic fermentation in fermenter 60, which is already maintained at an optimal fermentation temperature. Furthermore, in the aforesaid embodiment, the addition of CO2 is an efficient means of displacing oxygen and speeding up anaerobic fermentation.

Heating and rotation can be applied in the acceleration step 103 for up to 48 hours. In particular, rotation for 36-48 hours at 37° C. is shown to accelerate the subsequent fermentation step. However, the process does not require a minimum rotation period to be effective, and the ground waste can be brought to the required temperature and rotated for as little as one hour. By applying inoculant and mixing by rotation for up to 48 hours at the desired temperature, anaerobic fermentation is accelerated while reducing further reliance on rotation and other mechanical mixing processes in subsequent steps.

In the preferred embodiment, the accelerator comprises a temperature sensor to automatically determine when the desired temperature is reached. In other embodiments, the accelerator additionally comprises one or more sensors to measure, pH, pressure, and other factors. For instance, a pH sensor can be used to track changes in the food waste over the rotation period.

After acceleration, the fermentation-ready waste can be pumped 55 or otherwise transferred to fermentation tank 60 for anaerobic fermentation 104.

Anaerobic Fermentation

Due to the acceleration step 103, anaerobic fermentation 104 can occur relatively quickly and without requiring further mixing within fermenter 60. Accelerated food waste within fermenter 60 undergoes anaerobic, acidic fermentation 103 until a pH of 5 or below is reached. Fermenter 60 is sealed and temperature-controlled to maintain a constant temperature for anaerobic fermentation, and preferably comprises internal sensors to monitor data points such as pH and temperature. Fermentation to reach the desired pH may take up to 120 hours depending on factors such as the composition of the deposited food waste, the variety of inoculants used, and the length of time the screened food waste undergoes acceleration 103. Due to the mixing and temperature optimization performed by the accelerator, this process does not necessarily require additional rotation during fermentation in order to achieve results in an efficient timeframe. However, in some embodiments rotation may be applied, without departing from the overall process of the invention.

The inoculant microbes added during the acceleration step 103 excrete organic acids as they consume sugars and nutrients present in the organic material during fermentation 104. These organic acids dramatically lower the pH of the fermenting waste so that pathogens are unable to survive. In addition, this process creates an environment inhospitable to methanogens, suppressing methane generation in the anaerobic environment. Another factor in avoiding methane generation is the rapid fermentation time.

The primary reaction occurring during fermentation of organic waste can be described by the following equation, where one mol of glucose is converted into one mol of lactic acid, one mol of ethanol, and one mol carbon dioxide. This type of fermentation is called heterolactic fermentation (commonly called lactic acid fermentation).

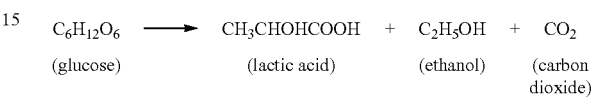

$$C_6H_{12}O_6 \longrightarrow CH_3CHOHCOOH + C_2H_5OH + CO_2$$
(glucose)     (lactic acid)     (ethanol)     (carbon dioxide)

As seen in the above reaction, no methane is produced during lactic acid fermentation. End products of heterolactic fermentation include organic acids such as lactic, acetic, and propionic acid, making their growth environment unfavorable for the growth of many pathogens and spoilage bacteria. Organic acids are thought to function as antimicrobials by interfering with the maintenance of cell membrane potential, inhibiting active transport, reducing intracellular pH, and inhibiting a variety of metabolic functions. Thus, the process results in byproducts that do not necessarily require further pasteurization or treatment. However, in some embodiments, heat sterilization or other sterilization treatments may be applied here or at other points in the process, without departing from the overall process of the invention.

Another outcome of anaerobic fermentation is the breakdown of cell walls of the organic matter, releasing the high concentration of water present in food. Fermentation releases the moisture held within the food waste and allows for the easy separation of solids and liquids once the fermented material has been released from the fermentation tank. The increase in liquids also makes the mixture conducive to pumping, so that the fermented waste can subsequently be pumped 65 to solid-liquid separator 70 for separation step 105.

Solid-Liquid Separation

The result of anaerobic fermentation step 104 is a fermented waste comprising solid fermented food waste 2 and fermentation-treated liquid 3 that are subsequently separated 105 by separator 70. Separation 105 can be performed by active or inactive means, including passive draining, centrifugal screener, vibratory drain filter, hydraulic press, belt filter press, etc. . . . , or combinations of the foregoing. For instance, separator 70 may comprise a vibratory drain filter that uses a mechanical sifting movement to separate the fermentation-treated liquid 3 from the solid fermented food waste 2. In some embodiments, a filter or clarifier may be applied to the fermentation-treated liquid 3 in order to remove free-floating solids. Fermentation-treated liquid 3 can be applied as lubricant in other steps of the process, as previously disclosed, but it may also be applied to the bioelectric reactor 90 as will be discussed below. Furthermore, as a result of the fermentation process 104 the separated fermentation-treated liquid is of a sufficient quality to discharge within municipal guidelines and regulations.

The solid fermented food waste 2 is then transferred to drying and distilling apparatus 80 for drying and distilling step 106.

Drying and Distilling

Drying step 106 comprises drying the solid fermented food waste 2 and, in conjunction with said drying, distilling evaporated liquid from said separated solid food waste 2, to collect a useful or valuable fermentation distillate 4. With reference to FIG. 2, the preferred embodiment of drying and distilling apparatus 80 for performing drying step 106 comprises a drying apparatus 81 for heating and drying separated solid fermented waste 2 coupled to a distillation apparatus 82 for distilling and collecting fermentation distillate 4. The result is valuable fermentation distillate 4 and a dried fermented waste 3 that can be further processed into fertilizer and other products.

Drying apparatus 81 may be a fluid bed dryer, which introduces hot air or gas upward through the bed of solid fermented waste 2 to dry the waste. Another embodiment may utilize a heat source 811 in combination with convective drying by an airflow 85. In some embodiments, the heat source 811 is infrared in order to minimize energy use. Other known drying apparatuses may be used without departing from the spirit of the invention. Drying can be performed for any period of time, but is preferably performed until the solid fermented food waste loses at least 50% of its weight. In other embodiments, a relative humidity sensor can be used as a metric to indicate dryness when the humidity in the heating apparatus begins to drop.

Drying apparatus 81 is coupled to a distilling apparatus 82 in order to capture evaporate, which is distilled into liquid, simultaneously with the drying step. Distilling apparatus should have a means 83 for extracting the vapor. For instance, vapor extraction can be performed by lowering temperature in the distilling apparatus. Due to the necessary heat source in the drying element, however, a preferable alternative may be to maintain constant temperature and instead use a pressure-based method such as vacuum distillation. In some embodiments, after vapor has been removed by distillation, air flow 86 may be recirculated, thus reducing exhaust. In other words, the preferred embodiment uses an energy efficient drying and distilling apparatus to dry the solid fermented food waste and simultaneously extract fermentation distillate 4.

Fermentation Distillate

Fermentation distillate 4 is usable in bioelectric reactor 90 and is also usable as a cleaning solution made from recycled food waste. Fermentation distillate 4 is an aqueous solution composed primarily of water and approximately 1.16% of purified organic acids and ethanol. Depending on the composition of the waste that was received and processed, the composition of the distillate per part water was found to be within the following ranges: Acetic Acid: 0.37-0.61%; Ethanol: 0.12-0.5%; Lactic Acid: 0.0086-0.031%; Butanoic acid: 0.01%; Formic acid: 0.005%; Propionic acid: 0.005%. In particular, lactic acid, acetic acid and ethanol have disinfectant and antibacterial properties and can be found in conventional and green cleaning products such as floor cleaners, window cleaners, surface cleaners, and hand sanitizers. While the distillate is clear and substantially odorless, ready for use as soon as it is collected without further treatment or processing, further post-processing such as adding dyes or fragrances may be desirable for use as a consumer product.

Post-Processing of Dried Fermented Waste

The remaining dried fermented waste 5 comprises a treated solid that is shelf-stable, pathogen free, and usable as fertilizer or insect or animal feed. It also contains an array of macro and micro nutrients, and organic acids which provide a natural pesticide effect. Due to the microbial fermentation process, in which pH is reduced to 4 or below, further pasteurization or treatment is not required for the dried fermented waste to be shaped and used in consumer and commercial applications. This dried fermented waste 5 can therefore be shaped 107 into various form factors for consumer and commercial use. For instance, it can be condensed into products such as cakes, pellets, or flakes. This step is performed in one or more post-processing units 110 that include hydraulic pressers, pelletizers, extruders, or even further drying units. Depending on the dryness of dried fermented waste 5 some post-processing may even require adding liquid in order to shape into desired form factors.

Bioelectric Reactor

In some embodiments, the fermentation-treated liquid 3 and/or the fermentation distillate 4 is further processed in a bioelectric reactor 90, which performs a secondary fermentation that yields electricity and further treats the liquid making it safe for discharge. Fermentation-treated liquid 3 and fermentation distillate 4 are rich in soluble organic acids, and therefore can serve as a substrate for additional hydrogen and electricity production.

Bioelectric reactor 90 comprises a combination of Microbial Fuel Cells (MFC) 91 and Microbial Electrolysis Cells (MEC) 92. A microbial fuel cell produces electricity via the consumption of organic acids by exoelectrogenic bacteria. The flow of charge is incentivized by the presence of dissolved oxygen at the cathode, or positively charged end, of the microbial fuel cell. Once the reaction is complete, water and carbon dioxide are also produced, and the electric current can be stored in a small battery or capacitor for further use. Similar to an MFC, an MEC also uses exoelectrogenic bacteria within a polarized cell to degrade food waste, however, unlike the energy-generating MFC, an MEC consumes electricity and results in the production of hydrogen. Thus, current generated from the MFC can be used as input to the MEC to power the MEC. Given appropriate voltage and current input, an MEC will release free hydrogen ions into an appropriate hydrogen storage vessel. In an alternative embodiment, the MEC may be omitted and electricity from the MFC used to contribute power to the process generally or to specific steps of the process.

The bioelectric reactor described here also results in the settling and consumption of suspended solids and the reduction of biological oxygen demand (BOD), chemical oxygen demand (COD), and volatile solids. Biological Oxygen Demand, or BOD, is a measurement of the capacity to deplete oxygen levels in aquatic ecosystems for a given wastewater. MFC's achieve BOD reductions that are comparable to the single most energy demanding process in many wastewater treatment facilities, aeration. As a result, leachate and distillate may be discharged with fewer additional treatment steps or with fewer COD penalties typically imposed by regulations.

Liquid that accumulates in other steps of the process can also be processed in bioelectric reactor 90. For instance, fermentation-treated liquid 3 from separation step 104 can be transferred to the bioelectric reactor for further processing. In some embodiments, the liquids input to the bioelectric reactor 90 undergo neutralization processing comprising the addition of a chemical neutralization agent, such as Sodium Hydroxide, Sodium Bicarbonate, or Calcium Carbonate. One or more neutralization agents may further be introduced to the input liquid stream to adjust pH to a value that allows for increased survival of exoelectrogenic bacteria. Values may fall generally in a range of 6 and 7. The streams may be combined in a retention vessel of appropriate size, depending on the scale and process time required by the facility.

Optimizing Output by Altering Parameters

As detailed herein, the present invention yields an array of useful end products, from electricity to fertilizer. Yields of these useful end products can be optimized as desired, including in response to real time data pertaining to the composition of the food waste that was collected during intake or at some other point in the process, such as by testing holding tank batches. Yields may be altered by varying such parameters as: the composition of the inoculant; the length of time in either the accelerator or the fermenter; and the temperature of either the accelerator or the fermenter. For instance, lactic acid yield is maximized when the food waste is accelerated 103 at a temperature of 37° C.

In another example, where the production of hydrogen is desired to be maximized, pre-treatment applied in the accelerator 50 should have the purpose of maximizing the concentration of simple sugars for the utilization of hydrogen producing micro-organisms. In this example, accelerator temperature has been found to be optimal between 30° C. and 50° C., and the inoculant applied should at least comprise Enterobactericae and Clostridiaceae. Process parameters, such as the adjustment of water content, may be modified to maximize the production of glucose from complex carbohydrates. In other embodiments, parameters that result in the maximization of acetic acid would be applied, as acetic acid has been shown to have the highest theoretical electrical yield when input to the bioelectrical reactor 90.

The invention claimed is:

1. A process for treating food waste comprising the steps of:
   removing inorganic items from food waste deposited in a screening enclosure, resulting in a screened waste;
   transferring the screened waste from the screening enclosure to a reducing apparatus;
   reducing, via the reducing apparatus, the screened waste into uniform particles, resulting in a ground waste;
   transferring the ground waste from the reducing apparatus to an accelerator;
   converting, via the accelerator, the ground waste to a fermentation-ready waste, said converting comprising:
      applying an inoculant to the ground waste,
      raising a temperature of the ground waste to between 20 and 50 degrees Celsius, and
      mixing the ground waste with the inoculant for up to 48 hours, resulting in the fermentation-ready waste;
   transferring the fermentation-ready waste from the accelerator to a fermenter;
   fermenting, via the fermenter, the fermentation-ready waste to a fermented waste having a pH of 5 or below, said fermenting comprising anaerobic, acidic fermentation;
   transferring the fermented waste from the fermenter to a separator;
   separating, via the separator, the fermented waste into a solid fermented waste and a fermentation-treated liquid;
   transferring the solid fermented waste from the separator to a dryer;
   drying, via the dryer, the solid fermented waste until a weight of the solid fermented waste is reduced by 50% or greater, resulting in a dried fermented waste and a fermentation distillate,
      wherein the fermentation distillate is collected during said drying.

2. The process of claim 1, wherein the reducing apparatus comprises a conveyer for moving the screened waste through an industrial shredding blade apparatus and into an industrial waste disposal grinder operable to reduce the screened and shredded waste to the ground waste having a particle size no greater than ½ cubic inch.

3. The process of claim 1, wherein the accelerator comprises a rotating mixing tank that is heated by circulation of a heated fluid, liquid or gas, convectively on the tank's surface.

4. The process of claim 2, wherein the accelerator comprises a rotating mixing tank that is heated by circulation of a heated fluid, liquid or gas, convectively on the tank's surface.

5. The process of claim 1, wherein the fermenting step is performed without rotation of the fermenter.

6. The process of claim 2, wherein the fermenting step is performed without rotation of the fermenter.

7. The process of claim 3, wherein the fermenting step is performed without rotation of the fermenter.

8. The process of claim 1 further comprising inputting the fermentation-treated liquid and/or the fermentation distillate to a bioelectric reactor comprised of a microbial fuel cell having exoelectrogenic bacteria for electricity generation.

9. The process of claim 2 further comprising inputting the fermentation-treated liquid and/or the fermentation distillate to a bioelectric reactor comprised of a microbial fuel cell having exoelectrogenic bacteria for electricity generation.

10. The process of claim 3 further comprising inputting the fermentation-treated liquid and/or the fermentation distillate to a bioelectric reactor comprised of a microbial fuel cell having exoelectrogenic bacteria for electricity generation.

11. The process of claim 5 further comprising inputting the fermentation-treated liquid and/or the fermentation distillate to a bioelectric reactor comprised of a microbial fuel cell having exoelectrogenic bacteria for electricity generation.

12. The process of claim 6 further comprising inputting the fermentation-treated liquid and/or the fermentation distillate to a bioelectric reactor comprised of a microbial fuel cell having exoelectrogenic bacteria for electricity generation.

13. The process of claim 7 further comprising inputting the fermentation-treated liquid and/or the fermentation distillate to a bioelectric reactor comprised of a microbial fuel cell having exoelectrogenic bacteria for electricity generation.

14. The process of claim 1 further comprising:
receiving the food waste in a food waste collection bin marked with a tracking number associated with a customer;
recording one or more parameters relating to a composition of the food waste in said food waste collection bin;
associating said parameters with the customer; and
transferring the food waste from the food waste bin to the screening enclosure.

15. The process of claim 2 further comprising:
receiving the food waste in a food waste collection bin marked with a tracking number associated with a customer;
recording one or more parameters relating to a composition of the food waste in said food waste collection bin;
associating said parameters with the customer; and
transferring the food waste from the food waste bin to the screening enclosure.

16. The process of claim 3 further comprising:
receiving the food waste in a food waste collection bin marked with a tracking number associated with a customer;
recording one or more parameters relating to a composition of the food waste in said food waste collection bin;
associating said parameters with the customer; and
transferring the food waste from the food waste bin to the screening enclosure.

17. The process of claim 4 further comprising:
receiving the food waste in a food waste collection bin marked with a tracking number associated with a customer;
recording one or more parameters relating to a composition of the food waste in said food waste collection bin;
associating said parameters with the customer; and
transferring the food waste from the food waste bin to the screening enclosure.

18. The process of claim 5 further comprising:
receiving the food waste in a food waste collection bin marked with a tracking number associated with a customer;
recording one or more parameters relating to a composition of the food waste in said food waste collection bin;
associating said parameters with the customer; and
transferring the food waste from the food waste bin to the screening enclosure.

19. The process of claim 6 further comprising:
receiving the food waste in a food waste collection bin marked with a tracking number associated with a customer;
recording one or more parameters relating to a composition of the food waste in said food waste collection bin;
associating said parameters with the customer; and
transferring the food waste from the food waste bin to the screening enclosure.

20. The process of claim 7 further comprising:
receiving the food waste in a food waste collection bin marked with a tracking number associated with a customer;
recording one or more parameters relating to a composition of the food waste in said food waste collection bin;
associating said parameters with the customer; and
transferring the food waste from the food waste bin to the screening enclosure.

21. The process of claim 1 further comprising post-processing the dried fermented waste by shaping said dried fermented waste into one or more treated byproducts.

22. The process of claim 1 further comprising post-processing the fermentation distillate into a consumer cleaning product.

23. The process of claim 22, wherein said post-processing comprises adding dyes or fragrances to the fermentation distillate.

24. The process of claim 1, wherein the fermentation distillate is usable as a cleaning solution without further processing.

25. The process of claim 1, wherein the fermentation distillate comprises water and approximately 1.16% purified organic acids and ethanol.

* * * * *